(12) United States Patent
Sashihara et al.

(10) Patent No.: US 6,251,517 B1
(45) Date of Patent: Jun. 26, 2001

(54) PRESSURE SENSITIVE ADHESIVE FOR PACKAGING PHOTOGRAPHIC MATERIAL

(75) Inventors: Kenji Sashihara; Yoshio Hara, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/258,262

(22) Filed: Feb. 26, 1999

(30) Foreign Application Priority Data

Feb. 26, 1998 (JP) .................................................. 10-062246

(51) Int. Cl.[7] .................................. C09J 7/02; B32B 7/12; B32B 7/14
(52) U.S. Cl. .................................. 428/355 AC; 428/41.5; 428/355 BL; 428/355 R
(58) Field of Search ............................ 428/41.5, 355 AC, 428/355 BL, 355 R

(56) References Cited

U.S. PATENT DOCUMENTS

| | | | |
|---|---|---|---|
| 4,693,776 | * 9/1987 | Krabpe et al. | 156/327 |
| 5,057,366 | * 10/1991 | Husman et al. | 428/355 |
| 5,252,395 | * 10/1993 | Maruoka | 428/355 |
| 5,486,426 | * 1/1996 | McGee et al. | 428/516 |
| 5,851,662 | * 12/1998 | Suzuki | 428/355 |
| 6,004,670 | * 12/1999 | Kobe et al. | 428/43 |

* cited by examiner

Primary Examiner—Daniel Zirker
Assistant Examiner—Frederick G. Dean
(74) Attorney, Agent, or Firm—Sughrue, Mion, Zinn, Macpeak & Seas, PLLC

(57) ABSTRACT

A pressure sensitive adhesive film having a film and a pressure sensitive adhesive composition of a polymer prepared by polymerization of acrylic or methacrylic monomer in the presence of a polymerization initiator having no cyano group and/or a polymer prepared by graft polymerization of acrylic or methacrylic monomer with an elastomer in the presence of a polymerization initiator having no cyano group is favorably employable for packaging photographic materials.

6 Claims, 1 Drawing Sheet

PRESSURE SENSITIVE ADHESIVE FOR PACKAGING PHOTOGRAPHIC MATERIAL

FIELD OF THE INVENTION

This invention relates to a pressure sensitive adhesive film and a pressure sensitive adhesive composition which are favorably employable for packaging photographic materials. In particular, the invention relates to a pressure sensitive adhesive film (such as a pressure sensitive adhesive tape and a pressure sensitive adhesive label) for temporarily fastening a roll of photographic material (e.g., photographic film, photographic paper), and a pressure sensitive adhesive composition for the use in the pressure sensitive adhesive film.

BACKGROUND OF THE INVENTION

A photographic material such as photographic film and photographic paper is generally produced by coating a photographic emulsion and other liquids on a wide plastic web (or a tape of pulp paper coated with resin) to form a photographic emulsion layer and other auxiliary layers. The web having the photosensitive layer is then wound up, and stored or transported in the form of a roll. On the occasion of practical use, the coated web is drew from the roll and cut to give a photosensitive film (e.g., photographic film or paper sheet) of a desired size.

In storage or transportation, the roll of photosensitive material is usually fastened with a fastening tape so as not to loosen. As the fastening tape, a thermal connective tape with hot-melt pressure sensitive adhesive composition is unfavorable because photographic material is sensitive to heat so that the applied heat often deteriorates the photographic material. In contrast, a pressure sensitive adhesive tape is easily attached onto the end and the surface of the roll using no heat, and is easily removed from them. Therefore, the pressure sensitive adhesive tape is practically used for packaging photographic materials.

In general, the pressure sensitive adhesive film comprises a support film and a pressure sensitive adhesive composition provided thereon. The adhesive composition contains a main pressure sensitive adhesive component of elastomer or acrylic resin and, if needed, other auxiliary components such as a vulcanization accelerator (e.g., a sulfur-containing compound such as disulfide) and rosin.

Besides as the fastening tape, the pressure sensitive adhesive film is often used for packaging photographic materials. For example, the pressure sensitive adhesive film is used in the form of a pressure sensitive adhesive label to be placed on each individual photographic film or paper, or to shield a light-shielding bag which contains a photographic film or paper. Further, the end of photographic film is fixed on a backing paper having the pressure sensitive adhesive sheet, and then wound up together with the backing paper to prepare a roll film (e.g., Brownie film). The pressure sensitive adhesive film is also used for connecting a black leader film to a photosensitive material to prepare a printing photosensitive roll for processing under daylight.

With respect to the pressure sensitive adhesive composition for the pressure sensitive adhesive film, various studies have been done. Since the pressure sensitive adhesive composition is employed in direct contact with photographic materials, it should not impair photographic characteristics of the photographic material. Further, the pressure sensitive adhesive composition is also required to give adequate adhesiveness and to be chemically stable. According to Japanese Patent Provisional Publication No. H3(1991)-177473, a pressure sensitive adhesive composition comprising acrylic polymer satisfies those conditions and hence is suitably employable for a pressure sensitive adhesive film for packaging photographic materials.

Although the acrylic pressure sensitive adhesive composition has good characteristics for packaging photographic material, however, the present inventors have found that further improvements are required in consideration of influences on photographic characteristics and adhesion given to photographic materials by the acrylic pressure sensitive adhesive composition.

Accordingly, it is an object of the present invention to provide an improved acrylic pressure sensitive adhesive composition or an improved elastomer pressure sensitive adhesive composition prepared by graft polymerization of an acrylic monomer.

Further, it is another object of the invention to provide a pressure sensitive adhesive film provided with the pressure sensitive adhesive composition.

SUMMARY OF THE INVENTION

The invention resides in a pressure sensitive adhesive film (or sheet) for packaging a photographic material comprising a film provided with a pressure sensitive adhesive composition which comprises at least one polymer selected from the group consisting of a polymer prepared by polymerization of a monomer component comprising acrylic or methacrylic monomer in the presence of a polymerization initiator having no cyano group and a polymer prepared by graft polymerization of a monomer component comprising acrylic or methacrylic monomer with an elastomer in the presence of a polymerization initiator having no cyano group.

The invention further resides in a pressure sensitive adhesive composition comprising at least one polymer selected from the group consisting of a polymer prepared by polymerization of a monomer component comprising acrylic or methacrylic monomer in the presence of a polymerization initiator having no cyano group and a polymer prepared by graft polymerization of a monomer component comprising acrylic or methacrylic monomer with an elastomer in the presence of a polymerization initiator having no cyano group.

Preferably, the above-mentioned polymerization initiator is a compound having azo(—N=N—) group. The acrylic or methacrylic monomer preferably is an ester derived from acrylic or methacrylic acid and an alcohol which has 1–12 carbon atoms and which may have two or more hydroxyl groups.

The invention further resides in a packaged roll of photosensitive material comprising a core, a pair of light-shielding flanges arranged on both ends of the core, a longitudinal light- sensitive sheet which is fixed at its inner end to the core and wound around the core and between the franges, a light-shielding leading sheet which is attached at its inner end to outer end of the light-sensitive sheet and wound around the light senstive sheet, and the above-mentioned pressure senstive adhesive film which is placed on outer end of the light-shielding leading sheet to temporarily fix the outer end of the leading sheet onto a surface of the leading sheet which is positioned under the outer end of the leading sheet.

DETAILED DESCRIPTION OF THE INVENTION

Figure 1:
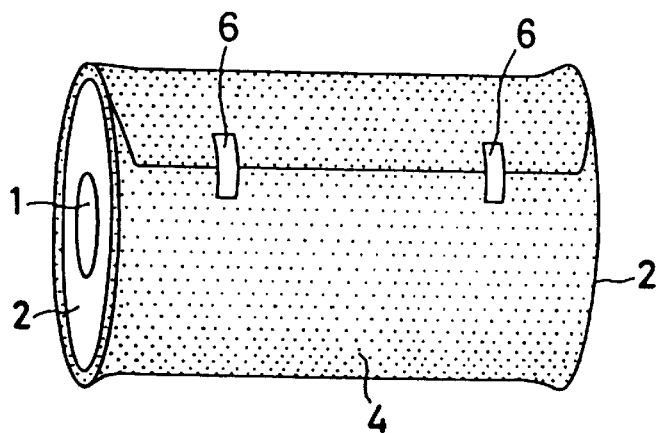
FIG. 1 is a schematic view of a packaged roll of photographic material.

The pressure sensitive adhesive composition of the invention is suitably employable as a pressure sensitive adhesive agent of the pressure sensitive adhesive film (or sheet) for packaging photographic materials. A detailed description of the pressure sensitive adhesive composition of the invention is given below.

The pressure sensitive adhesive composition of the invention comprises a polymer prepared by polymerization of a monomer component (comprising acrylic or methacrylic monomer) in the presence of a polymerization initiator having no cyano group, and/or a polymer prepared by graft polymerization of a monomer component (comprising acrylic or methacrylic monomer) with a rubber polymer in the presence of a polymerization initiator having no cyano group. Preferably, the acrylic or methacrylic [hereinafter often referred to as "(meth)acrylic"] monomer is an ester derived from (meth)acrylic acid and an alcohol which has 1–12 (more preferably 2–8) carbon atoms and which may have two or more hydroxyl groups. Examples of the (meth) acrylic monomers include methyl acrylate, ethyl acrylate, n-propyl acrylate, isopropyl acrylate, n-butyl acrylate, isobutyl acrylate, 2-ethylhexyl acrylate, 2-hydroxyethyl acrylate, methyl methacrylate, ethyl methacrylate, n-propyl methacrylate, isopropyl methacrylate, n-butyl methacrylate, isobutyl methacrylate, 2-ethylhexyl methacrylate, and 2-hydroxyethyl methacrylate. Acrylic acid and methacrylic acid also are employable.

A preferred (meth)acrylic monomer is a compound represented by the following formula (I).

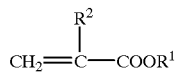

(I)

In the formula (I), $R^1$ represents a hydrogen atom, a straight or branched alkyl group of 3–12 carbon atoms or a hydroalkyl group (having a straight or branched alkyl group of 3–12 carbon atoms), and $R^2$ represents hydrogen atom or methyl group.

The (meth)acrylic monomers may be used singly or in combination of two or more kinds. Further, one or more copolymerizable monomers are also employable in combination with the (meth)acrylic monomer. Examples of the copolymerizable monomers include vinyl monomer (e.g., vinyl acetate), amino monomer (e.g., acrylamide, dimethylaminoethyl acrylate) and styrene monomer.

For the pressure sensitive adhesive composition of the invention, a graft copolymer derived from (meth)acrylic monomers and an elastomer is also employable. Examples of the elastomers include natural rubber, modified natural rubber, polybutadiene elastomer, styrene-butadiene elastomer, neoprene rubber, nitrile rubber, butyl rubber, and polyisoprene rubber. The elastomers may be used singly or in combination of two or more.

The polymerization initiator for preparing (meth)acrylic polymer should not contain cyano group. According to the study of the inventors, although the initiator is not an active component of the pressure sensitive adhesive composition, a polymerization initiator having cyano group impairs the photographic characteristics of the packaged photographic materials. Examples of the polymerization initiators having no cyano group include peroxides (e.g., hydrogen peroxide, peracid ester, metal peroxide), azo compounds, monosulfides and disulfides [those are decomposed with heat or other energy to generate radicals]; and a composition that generates radicals by redox reaction. A detailed description of the initiators having no cyano group is given in "Radical Polymerization (I)" (written by Takayuki Ohtsu, published by Kagaku Dojin, 1971, pp.15–78). Their examples are illustrated below.

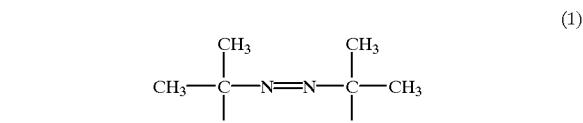

(1)

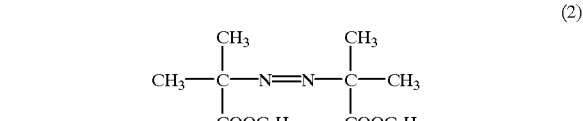

(2)

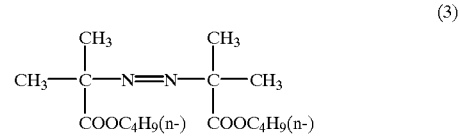

(3)

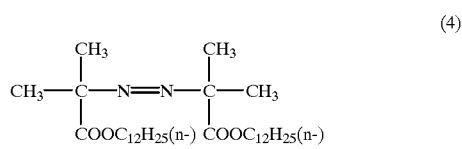

(4)

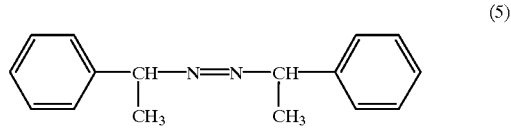

(5)

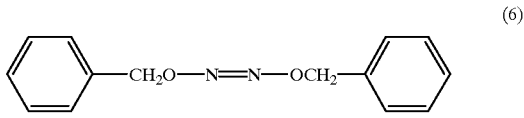

(6)

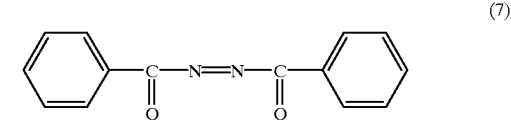

(7)

(8)

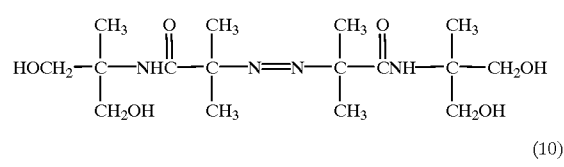

(9)

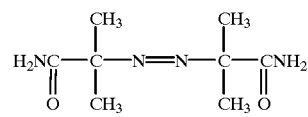

(10)

(11) 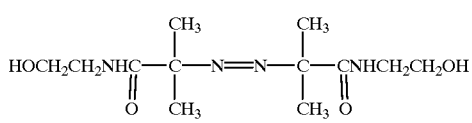

(12) 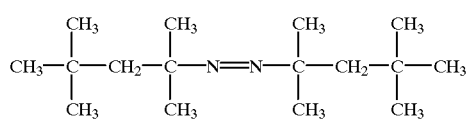

(13) 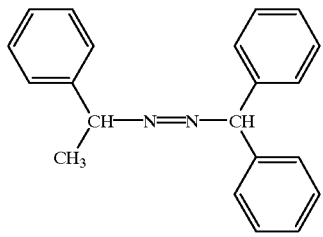

(14) 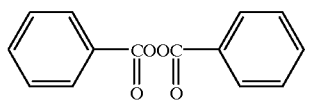

(15) (t-)C₄H₉OOC₄H₉(t-)

(16) (t-)C₄H₉OOH

(17) 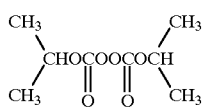

(18) 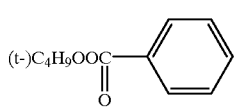

(19) 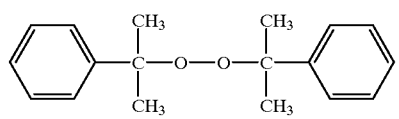

(20) 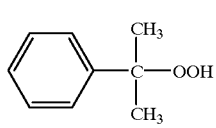

(21) $K_2S_2O_8$

(22) $K_2S_2O_8$ + $NaHSO_3$
(molar ratio 1/1)

(23) $H_2O_2$ + $FeCl_2$
(molar ratio 1/1)

(24) 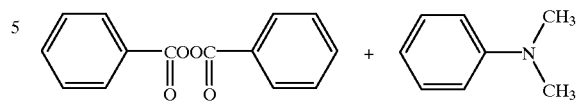
(molar ratio 1/1)

(25) 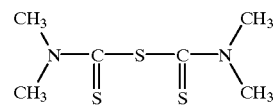

A preferred polymerization initiator is an azo compound (such as the above-illustrated compounds (1)–(13)), which has azo (—N=N—) group.

The azo compound particularly preferred is represented by the following formula (II).

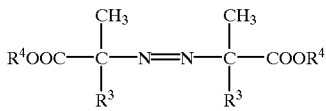

In the formula (II), $R^3$ represents a straight or branched alkyl group of 1–5 carbon atoms, and $R^4$ represents a straight or branched alkyl group of 1–20 carbon atoms.

In combination with the polymerization initiator having no cyano group, a known polymerization initiator having one or more cyano group may be used in a relatively small amount. Examples of the polymerization initiators having cyano group are illustrated below.

(26) 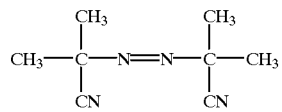

(27) 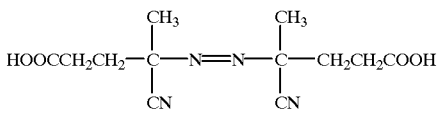

(28) 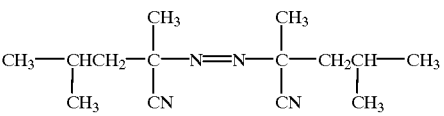

(29) 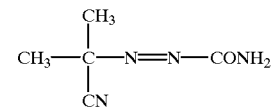

(30) 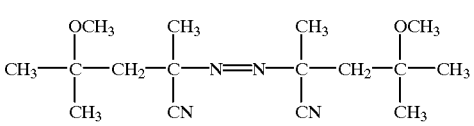

-continued

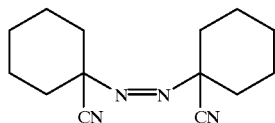
(31)

In accordance with the known process, the (meth)acrylic monomers (and, if needed, other copolymerizable monomers) can be polymerized in the presence of the polymerization initiator having no cyano group using heat, light or other energy.

The polymer thus prepared may be directly used as a pressure sensitive adhesive composition. In general, however, for enhancing the cohesive energy, the polymer is further copolymerized with other monomers (e.g., acrylic ester having a short side chain, vinyl acetate, styrene) or crosslinked with a crosslinking agent (e.g., isocyanate) or mixed with alkylphenolic resin to elevate the glass transition point. The (meth)acrylic monomers may be graft-copolymerized with elastomer to prepare a copolymer having advantages of a pressure sensitive adhesive elastomer. The graft copolymer and optional auxiliary components (such as other pressure sensitive adhesive elastomers, terpene resin, fluid paraffin, antioxidant, rosin, and lanolin) may be mixed to produce a pressure sensitive adhesive composition of the invention.

As the antioxidant, a phenolic antioxidant is employable. The phenolic antioxidant is incorporated generally in the range of 1–20 wt. %, preferably 2–10 wt. % based on the total amount of the adhesive composition. Examples of the phenolic antioxidants are described in "Binran Gomu and Plastic Haigo-Yakuhin (Handbook of Rubber and Plastic Compositions)" (published by Rubber Digest Corporation, 1966, pp.74–86).

The pressure sensitive adhesive composition (adhesive agent) of the invention may be dissolved in an aromatic solvent (e.g., toluene) to prepare a coating liquid (solid content: 20–30 wt. %). The liquid is applied onto a support sheet, and dried to produce the pressure sensitive adhesive sheet. For preparing the pressure sensitive adhesive film of the invention, the pressure sensitive adhesive composition is preferably coated on a support firm in an amount of 10 to 20 g/m² (in terms of solid content).

For the support film, materials used for those of the known pressure sensitive adhesive film are employable. Examples of the support material include films of polyesters (e.g., polyethylene terephthalate, polyethylene naphthalate), polyolefins (e.g., polyethylene, polypropylene), cellulose derivatives (e.g., cellulose triacetate) and chlorine-containing polyolefins (e.g., polyvinyl chloride). Metal foil, paper and resin-coated paper are also employable. The support sheet usually has a thickness of 5–200 µm (preferably, 10–100 µm).

The pressure sensitive adhesive sheet of the invention can be used in the form of pressure sensitive adhesive tapes, pressure sensitive adhesive labels, bags or boxes provided with a pressure sensitive adhesive layer.

In one preferred embodiment, the pressure sensitive adhesive sheet of the invention is employed for keeping a packaged roll of photosensitive material from exposure to light.

Figure 2:
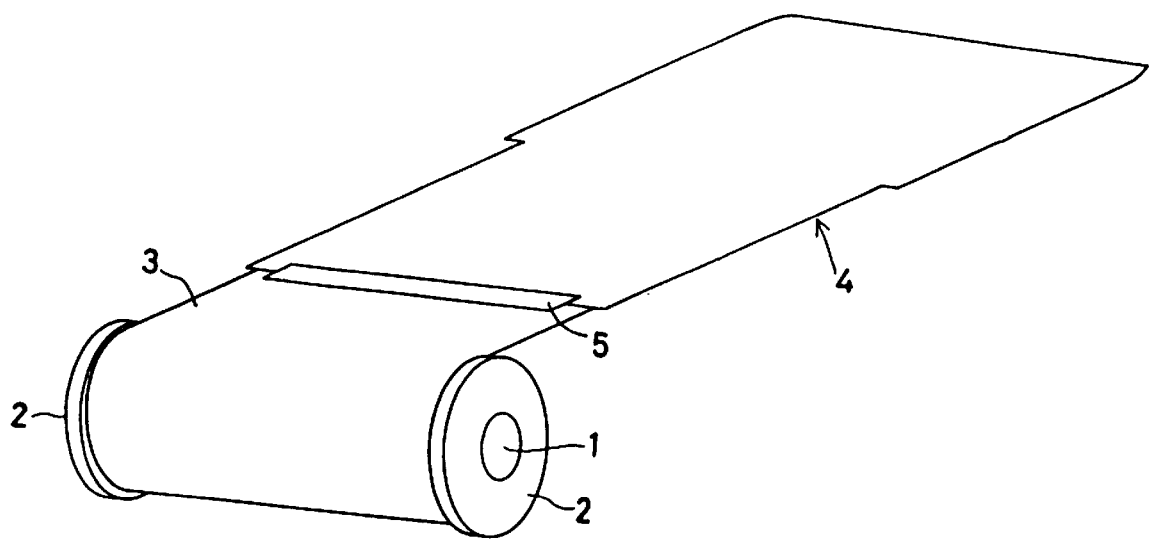
FIG. 2 is a shematic view of a roll of photographic material.

A typical packaged roll of photosensitive material is illustrated in FIGS. 1 and 2. The packaged roll of photosensitive material of FIGS. 1 and 2 comprises a core 1, a pair of light-shielding flanges 2 arranged on both ends of the core 1, a longitudinal light-sensitive sheet 3 which is fixed at its inner end to the core 1 and wound around the core 1 and between the franges 2, a light-shielding leading sheet 4 which is attached at its inner end to outer end of the light-sensitive sheet 3 and wound around the light senstive sheet 3, and a pressure senstive adhesive film 6 which is placed on outer end of the light-shielding leading sheet 4 to temporarily fix the outer end of the leading sheet onto a surface of the leading sheet which is positioned under the outer end of the leading sheet 4. The pressure sensitive adhesive film of the invention can be used as the adhesive film 6 of FIGS. 1 and 2. The pressure senstive adhesive film of the invention can be also employed as a tape 5 to combine the outer end of the light-sensitive sheet 3 and the inner end of the light-shielding leading sheet 4.

EXAMPLES

Example 1

Production of Pressure Sensitive Adhesive Film of Invention
(1) Preparation of Pressure Sensitive Adhesive Composition
1) Components

| | |
|---|---|
| natural rubber [kneaded pale crepe] | 100 weight parts |
| n-butyl methacrylate | 50 weight parts |
| polymerization initiator [aforementioned compound (1)] | 1.0 weight part |
| terpene-phenolic resin | 50 weight parts |
| fluid paraffin | 2 weight parts |
| toluene | 350 weight parts |

2) Procedures

A mixture of n-butyl methacrylate and the polymerization initiator was added to the natural rubber which was already kneaded by a pressure kneader, and then latex polymerization reaction was performed at 80° C. for 3 hours. The resulting solid was mixed with terpene phenolic resin and fluid paraffin, and dissolved in toluene to prepare a coating liquid. The liquid was coated on a paper sheet (basis weight: 72 g/m²) and dried at 100° C. for 60 seconds to form a pressure sensitive adhesive layer having 30 µm thickness (in terms of thickness after dryness). Thus, a pressure sensitive adhesive sheet of the invention was produced.

Comparison Example 1

Production of Pressure Sensitive Adhesive Film for Comparison

The procedures of Example 1 were repeated except for using 0.7 weight part of the aforementioned compound (26) as a polymerization initiator in place of 1.0 weight part of the compound (1), to produce a pressure sensitive adhesive film for comparison.

Comparison Example 2

Production of Pressure Sensitive Adhesive Film for Comparison

The procedures of Example 1 were repeated except for using 1.1 weight parts of the aforementioned compound (27) as a polymerization initiator in place of 1.0 weight part of the compound (1), to produce a pressure sensitive adhesive film for comparison.

Example 2

Production of Pressure Sensitive Adhesive Film of Invention
(1) Preparation of Pressure Sensitive Adhesive Composition
1) Components Pressure Sensitive Adhesive Components

| | |
|---|---|
| 2-ethylhexyl acrylate | 100 weight parts |
| polymerization initiator [compound (1)] | 1.4 weight parts |
| vinyl acetate | 20 weight parts |
| acrylic acid | 4 weight parts |
| toluene | 150 weight parts |
| [hardening components] | |
| isocyanate hardening agent [having three functional groups] | 40 weight parts |
| ethyl acetate | 60 weight parts |

2) Procedures

In accordance with solution polymerization method, the pressure sensitive adhesive components were polymerized. To the obtained polymer composition, 4.8 weight parts of a hardening solution (prepared from the hardening components) were added to prepare a coating liquid. The liquid was coated on a plastic film (Yupo Film [trade name], thickness: 80 $\mu$m) and dried at 100° C. for 60 seconds to form a pressure sensitive adhesive layer having 30 $\mu$m thickness (in terms of thickness after dryness). Thus, a pressure sensitive adhesive sheet of the invention was produced.

Example 3
Production of Pressure Sensitive Adhesive Film of Invention

The procedures of Example 2 were repeated except for using 1.6 weight parts of the aforementioned compound (2) as a polymerization initiator in place of 1.4 weight parts of the compound (1), to produce a pressure sensitive adhesive film of the invention.

Comparison Example 3
Production of Pressure Sensitive Adhesive Film for Comparison The procedures of Example 2 were repeated except for using 1.0 weight part of the compound (2) as a polymerization initiator in place of 1.4 weight parts of the compound (1), to produce a pressure sensitive adhesive film for comparison.

Evaluation of Pressure Sensitive Adhesive Films
(1) Evaluation on Adhesiveness 1) size of sample piece: 24.2 mm×110 mm 2) procedures: In accordance with JIS Z237, the adhesiveness of each pressure sensitive adhesive film was determined. The adhesive film was cut to give pieces of the above size, and one of them was placed on an indirect X-ray film under standard conditions (23±2° C., 65±5 RH%) so that the pressure sensitive adhesive layer of the piece might be brought in good contact with the photographic emulsion layer of the film. A weight of 630 g was placed on the laminated material, and left at 50° C. for 72 hours. After removing the weight, the laminated material was further stored under the standard conditions for 4 hours. The sample piece was then peeled off for 3 seconds, and the exposed surface was observed. Under observation, the samples were classified into the grades of "good (pressure sensitive adhesive layer completely remained on the support film)" and "poor (pressure sensitive adhesive layer partially or fully transferred onto the X-ray film)".

(2) Evaluation on Photographic Characteristics

1) In a dark room, the pressure sensitive adhesive layer of each sample sheet was covered with a piece of cheesecloth. On the cloth was placed a photosensitive photographic film (color negative film of ISO400) under the condition that the emulsion layer of the photographic film might be brought into good contact with the cloth. The laminated material was then encased in a moisture-proof bag. After sealed, the bag was stored at 50° C. for 3 days. After the storage, the photographic film was exposed to white light through an optical wedge, and developed. With respect to each of BL, GL and RL layers, fog density was measured by means of a densitometer. The measured density is represented by $D_s$.

2) Separately, a photosensitive photographic film (color negative film of ISO400) of the same type was alone encased in the moisture-proof bag. After sealed, the bag was stored at 50° C. for 3 days. After the storage, the photographic film was exposed to white light through an optical wedge, and developed. With respect to each of BL, GL and RL layers, fog density was measured by means of a densitometer. The measured density is represented by $D_b$.

3) The fog caused by the pressure sensitive adhesive composition was evaluated based on the value of $D_s-D_b$. Naturally, a smaller value of $D_s-D_b$ means that the pressure sensitive adhesive composition produces less fog.

(3) Results

The results of the above-described evaluation are set forth in Table 1. Since the BL layer is the most sensitive to fog, the $D_s-D_b$ values of BL layer are set forth in Table 1.

TABLE 1

| | Ex. 1 | Ex. 2 | Ex. 3 | C. Ex. 1 | C. Ex. 2 | C. Ex. 3 |
|---|---|---|---|---|---|---|
| adhesion | good | good | good | good | good | good |
| $D_s-D_b$ | 0.01 | 0.01 | 0.01 | 0.65 | 0.60 | 0.60 |

What is claimed is:

1. A pressure sensitive adhesive film for packaging photographic material comprising a film provided with a pressure sensitive adhesive composition which comprises at least one polymer selected from the group consisting of a polymer prepared by polymerization of a monomer component comprising acrylic or methacrylic monomer in the presence of a polymerization initiator having —N═N— group and having no cyano group and a polymer prepared by graft polymerization of a monomer component comprising acrylic or methacrylic monomer with an elastomer in the presence of a polymerization initiator having —N═N— group and having no cyano group.

2. The pressure sensitive adhesive sheet of claim 1, wherein said acrylic or methacrylic monomer is an ester derived from acrylic or methacrylic acid and an alcohol which has 1–12 carbon atoms and which may have two or more hydroxyl groups.

3. The pressure sensitive adhesive film of claim 1, wherein said elastomer is selected from the group consisting of natural rubber, modified natural rubber, polybutyldiene elastomer, styrene-butadiene elastomer, neoprene rubber, nitrile rubber, butyl rubber, polyisoprene rubber and combinations of two or more thereof.

4. A pressure sensitive adhesive composition comprising at least one polymer selected from the group consisting of a polymer prepared by polymerization of a monomer component comprising acrylic or methacrylic monomer in the presence of a polymerization initiator having —N═N— group and having no cyano group and a polymer prepared by graft polymerization of a monomer component comprising acrylic or methacrylic monomer with an elastomer in the presence of a polymerization initiator having —N═N— group and having no cyano group.

5. The pressure sensitive adhesive composition of claim 4, wherein said acrylic or methacrylic monomer is an ester derived from acrylic or methacrylic acid and an alcohol which has 1–12 carbon atoms and which may have two or more hydroxyl groups.

6. The pressure sensitive adhesive composition of claim 4, wherein said elastomer is selected from the group consisting of natural rubber, modified natural rubber, polybutyldiene elastomer, styrene-butadiene elastomer, neoprene rubber, nitrile rubber, butyl rubber, polyisoprene rubber and combinations of two or more thereof.

\* \* \* \* \*